United States Patent [19]

Dvirka et al.

[11] Patent Number: 4,681,045
[45] Date of Patent: Jul. 21, 1987

[54] TREATMENT OF FLUE GAS CONTAINING NOXIOUS GASES

[75] Inventors: Miro Dvirka, Garden City, N.Y.; George J. Psihos, Edina, Minn.; Joseph J. Cosulich, Syosset, N.Y.

[73] Assignee: William F. Cosulich Associates, P.C., Woodbury, N.Y.

[21] Appl. No.: 888,394

[22] Filed: Jul. 21, 1986

[51] Int. Cl.$^4$ .......................... F23J 11/00; F23J 15/00
[52] U.S. Cl. .................................... 110/345; 110/343; 423/232
[58] Field of Search ...................... 110/343, 344, 345; 423/232, 240 R, 240 S, 241

[56] References Cited

U.S. PATENT DOCUMENTS 4,547,351 10/1985 Im et al. ........................ 110/343 X

FOREIGN PATENT DOCUMENTS 2107601 5/1983 United Kingdom ................ 110/343

Primary Examiner—Edward G. Favors
Attorney, Agent, or Firm—Lalos & Keegan

[57] ABSTRACT

A process for reducing the formation of dioxins in the incineration of wastes that includes using sodium carbonate or sodium bicarbonate to react with chlorides formed in the incineration process. When sodium bicarbonate is used in the temperature range of 1561° F. to 518° F. a greater porosity is achieved that achieves a high degree of removal of the chlorides thereby preventing their reaction to produce dioxins.

100 Claims, No Drawings

TREATMENT OF FLUE GAS CONTAINING NOXIOUS GASES

SUMMARY OF THE INVENTION

A process for reducing noxious gases such as HCl and $Cl_2$ that may form toxic substances, such as dioxins when combined with organic material, such as lignin when such gases are produced from the incineration of waste material and reduce acid gas emission such HCl and $SO_2$.

The process includes the injection of sodium carbonate or sodium bicarbonate as sorbents into the furnace, boiler or flue duct after the combustion chamber to react with the chlorides to form sodium chloride. When sodium bicarbonate is injected within the temperature range of 1564°–518° F., the sodium bicarbonate loses water and carbon dioxide to become more porous and more reactive to react with the chlorides and other acid gases. The sorbent also reacts with $SO_2$ and removes this noxious gas as sodium sulfate and sodium sulfite.

In an optional step, the sorbent may be injected into the combustion zone, melted to form liquid particles that adhere to fly ash and react with the chlorides to form sodium chloride as a reaction product. This reaction product is diffused into the liquid sorbent particle and then solidifed for easy removal.

BACKGROUND OF THE INVENTION

The removal of noxious gases and toxic emissions from combustion systems particularly municipal solid waste incinerators and refuse to energy plants has received much attention during the past decade as public concern over the environmental impact as such emissions has increased. Dioxins and their role in polluting the environment have received particular attention as they have been recognized as causing serious health hazards. It has long been recognized that the removal of these noxious gases is desirable however no efficient and effective method or apparatus has been accepted in the industry as the solution to the mounting problems caused by these noxious emissions.

Noxious gas removal systems are of various types and many are available today. The most commonly used systems are wet or dry scrubbers which remove acid gases such as HCl and $SO_2$ from the flue gas as it exits the boiler or back end of the system. However, these systems are capital intensive to install, costly to operate and maintain, require significant energy during the reaction or removal and require excessive quantities of any sorbent that would be used.

In an attempt to avoid the requirement for wet or dry scrubbers, several systems have been developed which inject the sorbent directly into the combustion chamber either with the fuel or injected separately. Each of these systems has demonstrated varying degrees of success but no direct injection system has been able to achieve 90 percent HCl and 70 percent $SO_2$ removal as required in states such as New Jersey, California and Connecticut.

The prior art is replete with various processes for the treatment of flue gases and includes for instance U.S. Pat. No. 4,245,573 to Dixit et al. directed to the use of an additive such as MgO.Mg silicate injected into flue gas stream.

U.S. Pat. No. 4,185,080 issued to Rechmeier discloses the use of limestone or dolomite being added to cold dust furnace or blasted into the furnace together with fuel oil.

In U.S. Pat. No. 4,253,408, issued to Kramer, additive materials that include calcium oxide are combined with the sewage to prevent corrosion in the incinerator.

In the Hughes U.S. Pat. No. 4,159,683, a basic additive, sodium bentonite, is added to the furnace directly to reduce soot and slag but the high temperatures to which the additive is subjected in the combustion chamber would be too high for the desired effective reaction to take place.

Calcium oxide is suggested in the Roma Pat. No. 2,800,172 to be added to the combustion air to limit slag formation. Again the temperature would be too high to attain the effective reaction.

An interesting method of removal of $SO_2$ is disclosed in the publication *Chemical Engineering*, Feb. 20, 1984, pp. 30–33, 35. This method proposes the use of limestone, dolomite or lime to achieve its hoped for goal. The thrust of the article appears to propose the development of a technique to control furnace temperatures so that the limestone does not experience "dead burn".

The principal reasons why none of the prior art methods found favor were numerous but they did include (a) the thermodynamic equilibrium did not favor the desired reactions that were to take place, (b) the rates of reaction were much too slow to permit sufficient amounts to react, (c) the temperature of the injection of whatever sorbent was used for either too high or too low to achieve the reaction sought, (d) the sorbents at times became incapacitated due to dead burn and/or were inherently unable to sorb the pollutants due to its lack of porosity, and (e) the reactants/products expansion coefficient.

It is believed that to date there are no proven techniques or prior art processes which prevent the formation of polychlorinated dibenzo-p-dioxins (PCDD) and polychlorinated dibenzofurans (PCDF) in solid waste incinerators or resource recovery systems.

It is currently believed that the primary source of the PCDD and PCDF found in the flue gas of incinerated waste is caused by chloride donations by highly reactive chemicals such as HCl and $Cl_2$ to certain chlorinated organic chemical precursors such as the man-made chlorinated phenols and polychlorinated biphenyls (PCB) and non-chlorinated organic chemical precursors such as lignin as the flue gas cools after combustion.

It has been thought in the prior art that if the PCDD and PCDF precursor chemicals can be completely oxidized in the combustion process PCDD and PCDF will not form. However, there are no existing municipal solid waste incinerators or resource recovery facilities at which this theory has been demonstrated.

It now has been found that it is possible to prevent dioxins such as PCDD and furans such as PCDF from forming by removing potential chloride donors such as HCl and $Cl_2$ from the combustion gases. Provided that the temperatures of the gases in the combustion chamber are controlled within specified limits, it has been found that highly reactive carbonated sodium, a term generic to sodium bicarbonate and sodium carbonate, can be utilized to react with the potential chlorine donors to form stable salts before these chloride donors can react with the PCDD and PCDF precursor chemicals to form dioxins and furans.

DESCRIPTION OF THE INVENTION

It has been found that control of the temperature in an incinerator of solid waste material and other wastes is an important element in achieving the successful removal of the chlorides, whether in the form of HCl or $Cl_2$, from the flue gases. It is well known in the art to attempt to control the temperature of the combustion chamber and it has been found that the optimum method and apparatus is outlined in U.S. Pat. No. 3,552,335 and in U.S. Pat. No. 3,995,568, both of which patents include one of the present inventors in the inventorship entity. These patented disclosures are incorporated by reference in this application.

In any incinerator or waste materials or other burnables the flue gases generated typically contain noxious gases such as the chlorides whether in the form of hydrogen chloride or chlorine, which as previously stated combine with organic precursors to produce the undesirable dioxins and furans. In order to remove these chlorides from the flue gases, it is now proposed to attack the presence of the chlorides primarily in the zone adjacent the exit from the combustion zone.

It has been discovered that sodium carbonate, either the single sodium form better known as sodium bicarbonate, or the two atom form known as sodium carbonate or soda ash, can be used to achieve the particular purposes of removal of the chloride as well as the sulfur oxides, such as sulfur dioxide in the flue gas.

In general it has been found that the treatment of the flue gas can be very effective when treating not only the flue gas as it has passed out of the combustion zone but optionally and desirably the treatment of the flue gas can begin with the flue gas at the combustion zone in order to have the greatest opportunity for the removal of the greatest amount of the chloride.

In general the process of the present invention utilizes sodium bicarbonate as the sorbent in the flue gas when maintained at a temperature below the melting point of sodium carbonate, 1564° F., down to a temperature above 518° F. which is the temperature at which sodium bicarbonate will lose water and carbon dioxide present and convert to the two atom sodium form of sodium carbonate. In the optional step of the present invention, the use of either carbonate, sodium carbonate or sodium bicarbonate, is injected into the combustion zone at a temperature greater than 1564° F. and preferably below about 2300° F. to melt the sodium carbonate and form small liquid particles for the absorption of the chloride at very high temperatures.

Considering the use of the carbonate in the combustion zone, it has been found that it is important to maintain the temperature in the combustion zone of the incinerator to a temperature above 1564° F. and preferably below 2300° F. which can be easily accomplished in accordance with the apparatus and procedures outlined in the aforementioned U.S. patents having a common inventor with the present invention.

The sodium carbonate sorbent can be injected in a powder form or in a slurry. The size of the particles in the powder is not critical and may for instance range from 1 to 10 micron size or even much larger. The slurry can be of any concentration from 5 to 40 percent with 10 to 20 percent being preferred. The carbonate is then injected either in the overfire air supplied to support combustion as outlined in the Dvirka patents or injected on top of the garbage or other solid waste being burned. When the temperature is maintained in the range of 1564° F. and above, the carbonate will have sufficient time within about a second or more to be in contact with the high temperature zone and form liquid particles of carbonate.

In a typical large furnace the distance from the burners in the combustion zone to the exit from the combustion zone where the flue gases are less than about 1500° F. is perhaps 90 to 100 feet which normally would entail about 1 to 2 seconds or more travel time for the flue gases, certainly more than sufficient for the sodium carbonate to melt and the reaction with the chloride to take place.

When the carbonate has been injected onto the fuel bed of garbage or solid waste, the underfire air will blow the carbonate into the combustion zone where the combustion flame will melt the carbonate and also form the liquid particles. During this period of time the waste material is being incinerated producing chloride in the form of HCl and $Cl_2$. In addition to these chlorides other noxious gases such as $SO_2$ are being formed as well as minute particles of fly ash.

It has been found that the fly ash may have a particular capability of catalyzing any reaction with the chlorides, and any of the precursor organics, such as lignin which helped to form the dioxins or furans. The carbonate upon being formed into the liquid particles attacks the prospective formation of dioxins in two distinct ways.

First, the liquid particles will attach to the fly ash particles and this will tie-up the Lewis & Bromsted acid and base reaction sites which have been thought to act as catalysts for the production of dioxin by catalyzing the reactions of HCl and $Cl_2$ with the organic precursors. The liquid particle of carbonate mechanically and physically adheres to the fly ash and covers at least a portion of the surface of the fly ash thereby obscuring these acid and base reaction sites.

Second, the liquid droplets of carbonate react on their surfaces with chlorides in the form of HCl or $Cl_2$. This reaction will take place before, during or after the sorption of the fly ash particle into the liquid particle of carbonate.

Through the control of the temperature and the assurance of the carbonate being present for a time sufficient to melt it has been found that the carbonate particle does not become inactive through "dead burn".

The chloride reaction with the carbonate is a simple double displacement reaction wherein sodium chloride is formed as the product. It is in this connection that one of the unique features of the present invention is apparent.

The surface of the particle after having reacted with a chloride and producing the sodium chloride would ordinarily be considered to have produced an inactive site as far as further reaction is concerned if it were a solid such as calcium. However, since the sodium carbonate is in a liquid phase, it has been found that a diffusion process takes place within the liquid particle so that the sodium chloride is absorbed into the interior of the liquid particle and thereafter exposes more reactive surface in the form of fresh liquid carbonate within the liquid particle. This process is repeated cyclically in order to produce a liquid particle having absorbed within the periphery of the liquid particle the products of the reaction.

The rate of diffusion for the reaction products into the body of the liquid particle controls the efficiency, and therefore controls the rate of reaction. With the use of carbonate as the sorbent material in the combustion chamber, the efficiency and rate of reaction with chlorides are very good.

Of course it is understood that the waste material being incinerated is intended to be completely combusted, which should eliminate much of the fly ash. However, it generally is difficult to combust all of the waste material and thus the fly ash that is produced may include residual organics not combusted. These organics, that may include lignin or other organic materials, are susceptible to react with chloride ions that are then capable of reacting with other organic precursors to produce the deadly dioxins.

It is known that the hydrogen chloride and chlorine are an equilibrium in the flue gas and thus if the hydrogen chloride is removed, the equilibrium reaction will be so affected that there will be less and less chlorine that is capable of reacting in the form of free chlorine or as chloride ions with the organics to produce dioxin. It is for this reason that the reaction of the sorbent primarily with hydrogen chloride is particularly desirable.

The fly ash production is primarily attacked in the present process by the incorporation of the sorbent in or on the fuel bed of garbage or solid waste. Thus, when the combustion air from below the stoker beneath the fuel bed of garbage or waste material is blown up through the bed the sorbent will melt in the over 2000° F. temperature and is more likely to attach to any fly ash that is produced above the fuel bed.

This two phase attack upon the possible production of dioxins occurs through the use of the carbonate sorbent that, not only ties up the fly ash, but also reacts while in the molten state with chlorides, particularly those in the form of chloride ion so as to minimize the presence of chlorine to react with residual organics to produce the dioxins.

As the liquid particles of sorbent move away from the combustion zone within the combustion chamber and exit the combustion chamber, the environment is cooler and generally will be below 1564° F. The control of temperature to attain this required temperature at the exit of the combustion chamber is within the skill of those in the art based upon the disclosures in the Dvirka patents mentioned above.

This cooler environment below the melting point of sodium carbonate will solidify the sodium carbonate. The fly ash and sodium chloride that may be diffused within the periphery of the former liquid particle, now solidified, will all become an integral solid particle that will be removed from the flue gas by the typical particulate removal system known in the prior art, and also as disclosed in the aforementioned Dvirka patents includes a bag house or an electrostatic precipitator.

One of the most significant drawbacks of the optional liquid phase reaction is that the products of the reaction may come in contact and solidify on boiler tubes or flue duct work as the flue gases cool. Due to the potentially corrosive nature of this slag, use of this optional procedure may not always be desirable.

At this point within the incinerator system, the flue gas is cooled below 1564° F., all of the sodium carbonate sorbent has been solidified and removed along with fly ash that had been attached to the liquid particle as well as the sodium chloride derived from chloride ions that reacted with the molten sodium carbonate. There remains however significant amounts of chloride along with uncombusted organics capable of forming dioxin. It is then that the principal aspect of the present invention is brought to bear upon these chlorides in the cooler but still quite warm flue gas.

The temperature of the flue gas in this second phase of the invention is in the range between a temperature below 1564° F. down to about 518° F. Within this range it is possible for the significant removal of chlorides to take place to yield the considerably cleaner, less noxious gas effluent desired.

This is accomplished by further removal of substantially all of the chlorides as well as removal of noxious gases such as sulfur oxides. The solidified particle of sodium carbonate as it now passes through the cooler flue gas environment below 1564° F. is found to be incapable of any substantial reaction, if any, with the chlorides remaining in the flue gas. The solidification of the sodium carbonate has produced a glaze over the periphery of the solid sodium carbonate particle so that it exhibits essentially no porosity, and thus no meaningful ability to react further with the chlorides.

Porosity is a significant attribute which should be present in the sorbent. After the sorbent has been melted and then solidified, this porosity originally present in the solid sodium carbonate particle prior to melting is lost. While the melted sodium carbonate forming a liquid particle may not be viewed as porous, it does, as has been described, possess the capability of effecting a diffusion to renew the surface for continued reaction with the chlorides. When the sodium carbonate particle is glazed over, neither porosity nor diffusion capabilities are present.

It has been found that in the cooler flue gas, ranging from below about 1564° F. down to above about 518° F., that injection of sodium carbonate in at least one location along the flue gas path will enable the sorbent sodium carbonate to react with chlorides to produce sodium chloride, and at about 1100° F. and below will react with the sulfur oxides to produce sodium sulfate and sodium sulfite. The porosity of the sodium carbonate while present and capable of reacting with the chlorides in the flue gas is not as high as would be desirable in order to achieve the most beneficial reaction rate.

It has been determined that there are a number of important characteristics that an acceptable sorbent must possess in order to achieve the ultimate goal of reducing the presence of the noxious gases particularly chlorides from the flue gases.

Most reactions involving sorbent for the purpose of removal of the chlorides, whether chlorine or hydrogen chloride, are equilibrium reactions producing a chloride salt. When sodium carbonate is used as the reactant for the chlorides, the equilibrium is weighted in the direction of the formation of sodium chloride, whereas with calcium carbonate or calcium oxide or other calcium or alkaline earth salts the reaction is not as favorable towards the production of the salt and thus removal of the chloride is lessened.

Another aspect that must be considered is the rate of reaction. It has been found that when sodium carbonate is used, the rate of reaction with chlorides is expotentially faster than with calcium compounds such as calcium oxide. For instance it has been noted that it takes 525 seconds for calcium oxide to react completely with sulfur dioxide, but, when sodium carbonate is used, the reaction time is less than one second.

Porosity is another facet that must be considered in order to achieve the most efficient removal of the chlorides. High porosity obviously means greater surface area available for reaction as well as providing a situs for in situ positioning of the reaction products. Sodium carbonate has a modicum of porosity that is sufficient to achieve some of the benefits of the present invention and is considerably better than the porosity of the calcium carbonate or other calcium salts.

The porosity of sodium carbonate, however, can be improved and that capability of improvement is the reason why sodium bicarbonate is preferred. When the bicarbonate is injected into the flue gas, and the water and carbon dioxide is driven off at a temperature above 518° F., the surface of the remaining sodium carbonate will be much more porous and therefore considerably more reactive than sodium carbonate that was not derived from the bicarbonate.

One of the remaining significant characteristics that should be possessed by the sorbent in the present invention is the expansion coefficient, which in the context of this invention may be stated as, pore enclosure due to product layer expansion. It has been discovered that when sodium carbonate reacts with hydrogen chloride, for instance, to produce sodium chloride product, this product is embedded in situ in the pores of the sodium carbonate particle without clogging these pores thus allowing the pores to continue to react with chloride and continue to remain highly reactive. The reason for this it has been found is that the sodium chloride has an expansion coefficient less than 1, meaning the ratio of molar volume of solid product to molar volume of solid reactants is less than 1. Thus, the pores of the sodium carbonate particle are not clogged as is the case when other sorbents have been used.

When sodium carbonate is used, there is some reactivity that is found to be more than with other sorbents to more effectively remove the chlorides from the cooler flue gases. However, when the bicarbonate form is utilized there is a significant increase in the porosity as the water and carbon is driven off at temperatures above 518° F. This added porosity provides an enormously improved capability of reacting due to an enlarged surface area and also greater sites for in situ positioning of the reaction product, sodium chloride, without clogging up these pores.

The bicarbonate sorbent is desirably in a very fine powder form as previously mentioned although the particle size is not in any way critical.

The water and carbon dioxide is driven off almost immediately from the bicarbonate particularly when injected in the higher temperature portion of the range between 1564° F. and 518° F. That allows a substantial period of time for reaction between the produced porous sodium carbonate to react with the chloride. It has been found that at least about 1 second is required for the reaction between the porous sodium carbonate sorbent and the chloride to take place.

In the typical furnace the cooler flue gas outside of the combustion zone may be up to 100 feet in length or more. This is a more than ample path length to provide sufficient time for the chloride to react with the porous carbonate. The time may be even as much as several seconds up to perhaps 5 or 10 seconds if the length of path for exiting on flue gases is long.

To achieve the desirable goal of reacting substantially all of the chloride with the sorbent carbonate, it is desired to use at least one, but preferably two and up to three or four or even more locations for the injection of the powder carbonate in the form of sodium carbonate or sodium bicarbonate.

The specific location of an injection of the sorbent should take into consideration that sintering lessening the effectiveness of the sorbent, takes place at a temperature well below its melting point. It is preferable to inject the sorbent at the temperature sufficiently low to avoid sintering. More specifically, the sorbent should be injected, in at least one location in the flue gas at the lowest possible temperature so that the reaction time is sufficient to permit the sorbent adequately to absorb the chlorides, but also above the temperature at which dioxin is formed. Preferably, the temperature range is about 1000° F. to 1200° F., low enough to react with $SO_2$ at about 1100° F. to produce sodium sulfate and sulfite and also assure reaction with chlorides. Additional points of injection may be for example at flue temperatures of 1500° F., 1300° F., 900° F. and 700° F., i.e., between 1564° F. and 518° F. The efficiency of the reaction also increases at the lower temperatures.

A slurry is also feasible for sodium carbonate injection although powder form appears to be best suited for injection into the flue gas.

As these particles emerge from the cooler flue gas area they are collected and removed as in the typical furnace for collecting particulate matter and as has been previously mentioned may be collected in a bag house or an electrostatic precipitator.

The quantity of the sorbent used is dependent upon the amount of chloride present. Typically, it has been found that the total injection of carbonate sorbent including that in the combustion zone as well as that outside of the combustion zone should be about 40 to 80 pounds of carbonated sodium, whether sodium carbonate or sodium bicarbonate per ton of garbage or other solid waste to be incinerated. This presumes a content of about 0.2 percent chloride and 0.2 percent sulfur. If the preliminary analysis of the material to be incinerated indicates greater amounts of chlorine or sulfur present commensurate increases in the amounts of carbonated sodium should be made. In general it would be expected that about 60 pounds per tone of garbage would be acceptable.

The amount of the sorbent carbonated sodium may also be based upon the stoichiometric quantity required and generally the amount of carbonated sodium should be from 1 to 5 times the stoichiometric quantity to react with chlorides and sulfur oxides although as little as some amount over 1 and less than 2 times the stoichiometric quantity may be found desirable.

The foregoing has been a description of the invention and its scope should be limited solely by the following claims in which we claim:

1. A method of reducing the noxious gases such as chlorides including hydrogen chloride and chlorine from the flue gases derived from the incineration of solid waste materials in a furnace with a combustion chamber and a combustion zone to substantially reduce the formation of dioxins for a cleaner effluent gas to the atmosphere, comprising:
   introducing sodium bicarbonate into said flue gas of a furnace incinerating said waste materials,
   positioning introduction of sodium bicarbonate for at least one location along the path of said flue gas at a temperature below about 1564° F. but not below about 518° F.,
   heating said sodium bicarbonate in said flue gas for a time sufficient to drive off the water and carbon dioxide from said sodium bicarbonate, forming sodium carbonate particles during said heating of said sodium bicarbonate, said sodium carbonate having a higher porosity to produce a greater reaction area on the surface of said particles, contacting said porous sodium carbonate with chlorides in said flue gases for a sufficient time and temperature to react and product sodium chloride and thereby prevent their formation of dioxins, and separating said sodium chloride from said flue gas to produce a cleaner gas for exit to the atmosphere.

2. The method of claim 1 comprising, injecting said sodium bicarbonate at approximately the end of the combustion zone toward the flue gas exit.

3. The method of claim 1 comprising, the time of said contact of said porous sodium carbonate with said chlorides being at least 1 second.

4. The method of claim 1 wherein, said chlorides are HCl.

5. The method of claim 1 comprising, sorbing said chlorides onto and into the pores of said porous sodium carbonate.

6. The method of claim 5 wherein, said sorbing includes reacting said chlorides while maintaining an expansion coefficient of not greater than 1.

7. The method of claim 1 including, maintaining the temperature of the flue gases leaving the combustion chamber of said incinerator to below about 1564° F.

8. The method of claim 1 including, introducing said sodium bicarbonate into at least 2 locations down stream of any combustion of said solid waste materials.

9. The method of claim 1 including, said introduction of sodium bicarbonate being in powder form.

10. The method of claim 1 including, injecting said sodium bicarbonate at approximately the end of the combustion zone toward the flue gas exit, and the time of said contact of said porous sodium carbonate with said chlorides being at least 1 second.

11. The method of claim 1 including, injecting said sodium bicarbonate at approximately the end of the combustion zone toward the flue gas exit, the time of said contact of said porous sodium carbonate with said chlorides being at least 1 second, and said chloride is HCl.

12. The method of claim 1 including, injecting said sodium bicarbonate at approximately the end of the combustion zone toward the flue gas exit, the time of said contact of said porous sodium carbonate with said chlorides being at least 1 second, said chloride is HCl, and sorbing said chlorides onto and into the pores of said porous sodium carbonate.

13. The method of claim 1 including, injecting said sodium bicarbonate at approximately the end of the combustion zone toward the flue gas exit, the time of said contact of said porous sodium carbonate with said chlorides being at least 1 second, said chloride is HCl, sorbing said chlorides onto and into the pores of said porous sodium carbonate, and said sorbing includes reacting said chlorides while maintaining an expansion coefficient of not greater than 1.

14. The method of claim 1 including, injecting said sodium bicarbonate at approximately the end of the combusion zone toward the flue gas exit, the time of said contact of said porous sodium carbonate with said chlorides being at least 1 second, said chloride is HCl, sorbing said chlorides onto and into the pores of said porous sodium carbonate, said sorbing includes reacting said chlorides while maintaining an expansion coefficient of not greater than 1, and maintaining the temperature of the flue gases leaving the combustion chamber of said incinerator to below about 1564° F.

15. The method of claim 1 including, injecting said sodium bicarbonate at approximately the end of the combustion zone toward the flue gas exit, the time of said contact of said porous sodium carbonate with said chlorides being at least 1 second, said chloride is HCl, sorbing said chlorides onto and into the pores of said porous sodium carbonate, said sorbing includes reacting said chlorides while maintaining an expansion coefficient of not greater than 1, maintaining the temperature of the flue gases leaving the combustion chamber of said incinerator to below about 1564° F., and introducing said sodium bicarbonate into at least 2 locations down stream of any combustion of said solid waste materials.

16. The method of claim 1 including, introducing said sodium bicarbonate into at least 2 locations down stream of any combustion of said solid waste materials, and the time of said contact of said porous sodium carbonate with said chlorides being at least 1 second.

17. The method of claim 1 including, introducing said sodium bicarbonate into at least 3 locations down stream of any combustion of said solid waste materials, the time of said contact of said porous sodium carbonate with said chlorides being at least 1 second, and said chloride is HCl.

18. The method of claim 1 including, introducing said sodium bicarbonate into at least 2 locations down stream of any combustion of said siolid waste materials, the time of said contact of said porous sodium carbonate with said chlorides being at least 1 second, said chloride is HCl, sorbing said chlorides onto and into the pores of said porous sodium carbonate, and said sorbing includes reacting said chlorides while maintaining an expansion coefficient of not greater than 1.

19. A method of preparing a sorbent for adsorption of noxious flue gases such as chlorides from an incinerator of solid waste materials comprising, introducing the sorbent sodium bicarbonate into said gases at a temperature between about 1564° F. and 518° F., driving off the water and carbon dioxide from said sorbent to convert said bicarbonate to the carbonate, simultaneously forming a porous surface on said sorbent to produce a greater reactive area for said sorbent to adsorb and react with said chlorides upon sufficient contact time.

20. The method of claim 19 including,
sorbing said chlorides onto and into the pores of said pores sodium carbonate.

21. The method of claim 20 including,
said sorbing includes reacting said chlorides while maintaining an expansion coefficient of not greater than 1.

22. The method of claim 19 including,
the time of said contact of said porous sodium carbonate with said chlorides being at least 1 second.

23. The method of claim 19 including,
sorbing said chlorides onto and into the pores of said porous sodium carbonate,
said sorbing includes reacting said chlorides while maintaining an expansion coefficient of not greater than 1, and
the time of said contact of said porous sodium carbonate with said chlorides being at least 1 second.

24. A method of reducing the noxious gases such as chlorides including hydrogen chloride and chlorine from the flue gases derived from the incineration of solid waste materials in a furnace with a combustion chamber to substantially reduce the formation of dioxins or the like for a cleaner effluent gas to the atmosphere comprising,
introducing a sorbent comprising a carbonated sodium into the combustion chamber for incinerating said solid waste materials and into the presence of chloride gases generated from said incineration,
maintaining the temperature in said combustion chamber to be above about 1564° F. to incinerate said solid waste materials and form said flue gases and fly ash in said flue gas,
melting said sorbent in said chamber to form a plurality of liquid particles,
contacting said sorbent particles with said fly ash and attaching said particles to said fly ash to cover at least a portion of the surface of said fly ash while preventing at least in part said fly ash from any reaction activity with said chlorides,
cooling said liquid particles to solidify said sorbent particles while retaining the attached fly ash with said particles,
removing and collecting said solidified sorbent particles with said attached fly ash from said incinerator to minimize the reactive activity of said fly ash with said chlorides and thereby minimize the production of dioxins by said chlorides.

25. The method of claim 24 including,
contacting and reacting said liquid particles with chlorides during the time period said liquid particles remain liquid,
producing sodium chloride as one of the products of the reaction between said liquid particles and said chlorides,
retaining said products on said liquid particles for collection and removal upon solidification of said particles.

26. The method of claim 24 including, reacting said liquid particles with chlorides during the time period said liquid particles remain within said combustion chamber,
producing sodium chloride as one of the products of the reaction while attaching said particles to said fly ash, and
retaining said products and said fly ash to said liquid particles for collection and removal upon solidification of said particles.

27. The method of claim 25 including,
renewing the surface of said liquid particles following said reaction with chlorides and production of sodium chloride by penetrating said surface of said liquid particles presenting a new reactive surface on said liquid particle for further reaction with said chlorides,
cyclically repeating the reaction, penetration and surface renewal, and
removing and collecting said chlorides upon solidification of said sorbent.

28. The method of claim 25 including,
retaining said liquid particles within the combustion chamber for adequate time to sufficiently react said liquid particles with said chlorides.

29. The method of claim 25 including,
diffusing the sodium chloride into the liquid particles,
renewing the surface of said liquid particles to provide further reactive sites on said surface for cyclical reaction.

30. The method of claim 24 including,
introducing said sorbent onto a bed of said solid waste materials being incinerated.

31. The method of claim 24 including,
introducing said sorbent into the overfire air supporting combustion of said solid waste materials.

32. The method of claim 24 including,
tieing-up the Lewis & Bronsted acid/base sites on the surface of said fly ash by said attaching of said sorbent particles to said fly ash.

33. The method of claim 24 including,
said chloride being $Cl_2$.

34. The method of claim 24 including,
removal of chlorides in the form of HCl to minimize the presence of $Cl_2$ for reaction with organic matter in said flue gas and thereby substantially reduce the production of dioxins.

35. The method of claim 24 including,
said fly ash having chlorides attached thereto, and
removing said chlorides from said combustion zone by attaching said sorbent liquid particles to said fly ash.

36. The process of claim 25 including,
contacting said liquid particles with said chlorides for a time of at least 1 second to achieve sufficient reaction.

37. The process of claim 25 including,
introducing said sorbent into the overfire air supporting combustion of said solid waste materials.

38. The process of claim 25 including,
removal of chlorides in the form of HCl to minimize the presence of $Cl_2$ for reaction with organic matter in said flue gas and thereby substantially reduce the production of dioxins.

39. The process of claim 25 including,
removal of chlorides in the form of HCl to minimize the presence of $Cl_2$ for reaction with organic matter in said flue gas and thereby substantially reduce the production of dioxins, and said chloride being $Cl_2$.

40. The process of claim 25 including,
introducing said sorbent onto a bed of said solid waste materials being incinerated.

41. The process of claim 25 including,
diffusing the sodium chloride into the liquid particles,
renewing the surface of said liquid particles to provide further reactive sites on said surface for cyclical reaction, and
introducing said sorbent into the overfire air supporting combustion of said solid waste materials.

42. The process of claim 25 including,
retaining said liquid particles within the combustion chamber for adequate time to sufficiently react said liquid particles with said chlorides,
diffusing the sodium chloride into the liquid particles,
renewing the surface of said liquid particles to provide further reactive sites on said surface for cyclical reaction, and
introducing said sorbent onto a bed of said solid waste materials being incinerated.

43. The process of claim 25 including,
contacting said liquid particles with said chlorides for a time of at least 1 second to achieve sufficient reaction,
diffusing the sodium chloride into the liquid particles, and
renewing the surface of said liquid particles to provide further reactive sites on said surface for cyclical reaction.

44. The process of claim 25 including,
retaining said liquid particles within the combustion chamber for adequate time to sufficiently react said liquid particles with said chlorides,
diffusing the sodium chloride into the liquid particles,
renewing the surface of said liquid particles to provide further reactive sites on said surface for cyclical reaction,
introducing said sorbent onto a bed of said solid waste materials being incinerated,
introducing said sorbent into the overfire air supporting combustion of said solid waste materials, and
removal of chlorides in the form of HCl to minimize the presence of $Cl_2$ for reaction with organic matter in said flue gas and thereby substantially reduce the production of dioxins.

45. The process of claim 25 including,
retaining said liquid particles within the combustion chamber for adequate time to sufficiently react said liquid particles with said chlorides,
diffusing the sodium chloride into the liquid particles,
renewing the surface of said liquid particles to provide further reactive sites on said surface for cyclical reaction,
introducing said sorbent into the overfire air supporting combustion of said solid waste materials,
tieing-up the Lewis & Bronsted acid/base sites on the surface of said fly ash by said attaching of said sorbent particles to said fly ash, and
removal of chlorides in the form of HCl to minimize the presence of $Cl_2$ for reaction with organic matter in said flue gas and thereby substantially reduce the production of dioxins.

46. The process of claim 25 including,
retaining said liquid particles within the combustion chamber for adequate time to sufficiently react said liquid particles with said chlorides,
diffusing the sodium chloride into the liquid particles,
renewing the surface of said liquid particles to provide further reactive sites on said surface for cyclical reaction,
introducing said sorbent onto a bed of said solid waste materials being incinerated,
tieing-up the Lewis & Bronsted acid/base sites on the surface of said fly ash by said attaching of said sorbent particles to said fly ash,
removal of chlorides in the form of HCl to minimize the presence of $Cl_2$ for reaction with organic matter in said flue gas and thereby substantially reduce the production of dioxins,
said fly ash having chlorides attached thereto, and
removing said chlorides from said combustion zone by attaching said sorbent liquid particles to said fly ash.

47. The process of claim 24 including,
said sorbent being solid when introduced.

48. The process of claim 47 including,
said solid sorbent particle being subject to the temperature of greater than 1564° F. for a sufficient time to melt said solid sorbent particles to form said liquid sorbent particles.

49. The process of claim 25 including,
said solid sorbent particle being subject to the temperature of greater than 1564° F. for a sufficient time to melt said solid sorbent particles to form said liquid sorbent particles,
said sorbent being solid when introduced,
retaining said liquid particles within the combustion chamber for adequate time to sufficiently react said liquid particles with said chlorides,
diffusing the sodium chloride into the liquid particles,
renewing the surface of said liquid particles to provide further reactive sites on said surface for cyclical reaction,
introducing said sorbent onto a bed of said solid waste materials being incinerated,
tieing-up the Lewis & Bronsted acid/base sites on the surface of said fly ash by said attaching of said sorbent particles to said fly ash,
removal of chlorides in the form of HCl to minimize the presence of $Cl_2$ for reaction with organic matter in said flue gas and thereby substantially reduce the production of dioxins,
said fly ash having chlorides attached thereto, and
removing said chlorides from said combustion zone by attaching said sorbent liquid particles to said fly ash.

50. A method of reducing the noxious gases such as chlorides from the flue gases derived from the incineration of solid waste materials in a furnace with a combustion chamber to substantially reduce the formation of dioxins or the like for a cleaner effluent gas to the atmosphere comprising,
introducing sodium bicarbonate into said flue gas of a furnace incinerating said waste materials,
subjecting said sorbent to a temperature in said combustion chamber of at least 1564° F. for a time sufficient to melt said sorbent, to form liquid particles,
contacting said liquid particles with said chlorides for a time sufficient to react said chlorides with said liquid particles,
forming sodium chloride by said reaction,
retaining said sodium chloride to said liquid particles,
solidifying said liquid particles with said sodium chloride, collecting and removing said solidified particle.

51. The method of claim 50 including,
retaining said liquid particles within the combustion chamber for adequate time to sufficiently react said liquid particles with said chlorides.

52. The method of claim 50 including,
diffusing the sodium chloride into the liquid particles, and
renewing the surface of said liquid particles to provide further reactive sites on said surface for cyclical reaction.

53. The method of claim 50 including,
introducing said sorbent onto a bed of said solid waste materials being incinerated.

54. The method of claim 50 including,
introducing said sorbent into the overfire air supporting combustion of said solid waste materials.

55. The method of claim 50 including,
tieing-up the Lewis & Bronsted acid/base sites on the surface of said fly ash by said attaching of said sorbent particles to said fly ash.

56. The method of claim 50 including,
removal of chlorides in the form of HCl to minimize the presence of $Cl_2$ for reaction with organic matter in said flue gas and thereby substantially reduce the production of dioxins.

57. The method of claim 50 including,
contacting said liquid particles with said chlorides for a time of at least 1 second to achieve sufficient reaction.

58. The method of claim 50 including,
retaining said liquid particles within the combustion chamber for adequate time to sufficiently react said liquid particles with said chlorides,
diffusing the sodium chloride into the liquid particles, and
renewing the surface of said liquid particles to provide further reactive sites on said surface for cyclical reaction.

59. The method of claim 50 including,
diffusing the sodium chloride into the liquid particles,
renewing the surface of said liquid particles to provide further reactive sites on said surface for cyclical reaction, and
introducing said sorbent onto a bed of said solid waste materials being incinerated.

60. The method of claim 50 including,
diffusing the sodium chloride into the liquid particles,
renewing the surface of said liquid particles to provide further reactive sites on said surface for cyclical reaction, and
introducing said sorbent into the overfire air supporting combustion of said solid waste materials.

61. The method of claim 50 including,
diffusing the sodium chloride into the liquid particles,
renewing the surface of said liquid particles to provide further reactive sites on said surface for cyclical reaction,
introducing said sorbent onto a bed of said solid waste materials being incinerated,
introducing said sorbent into the overfire air supporting combustion of said solid waste materials, and
tieing-up the Lewis & Bronsted acid/base sites on the surface of said fly ash by said attaching of said sorbent particles to said fly ash.

62. The method of claim 50 including,
removal of chlorides in the form of HCl to minimie the presence of $Cl_2$ for reaction with organic matter in said flue gas and thereby substantially reduce the production of dioxins.

63. The method of claim 50 including,
retaining said liquid particles within the combustion chamber for adequate time to sufficiently react said liquid particles with said chlorides,
diffusing the sodium chloride into the liquid particles,
renewing the surface of said liquid particles to provide further reactive sites on said surface for cyclical reaction,
introducing said sorbent onto a bed of said solid waste materials being incinerated,
tieing-up the Lewis & Bronsted acid/base sites on the surface of said fly ash by said attaching of said sorbent particles to said fly ash, and
removal of chlorides in the form of HCl to minimize the presence of $Cl_2$ for reaction with organic matter in said flue gas and thereby substantially reduce the production of dioxins.

64. The method of claim 50 including,
said sorbent being solid when introduced.

65. The method of claim 50 including,
contacting said liquid particles with said chlorides for a time of at least 1 second to achieve sufficient reaction,
diffusing the sodium chloride into the liquid particles,
renewing the surface of said liquid particles to provide further reactive sites on said surface for cyclical reaction,
introducing said sorbent into the overfire air supporting combustion of said solid waste materials,
tieing-up the Lewis & Bronsted acid/base sites on the surface of said fly ash by said attaching of said sorbent particles to said fly ash,
removal of chlorides in the form of HCl to minimize the presence of $Cl_2$ for reaction with organic matter in said flue gas and thereby substantially reduce the production of dioxins, and
said sorbent being solid when introduced.

66. The method of claim 50 including,
diffusing the sodium chloride into the liquid particles,
renewing the surface of said liquid particles to provide further reactive sites on said surface for cyclical reaction,
introducing said sorbent onto a bed of said solid waste materials being incinerated,
tieing-up the Lewis & Bronsted acid/base sites on the surface of said fly ash by said attaching of said sorbent particles to said fly ash,
removal of chlorides in the form of HCl to minimize the presence of $Cl_2$ for reaction with organic matter in said flue gas and thereby substantially reduce the production of dioxins, and
said sorbent being solid when introduced.

67. The method of claim 50 including,
contacting said liquid particles with said chlorides for a time of at least 1 second to achieve sufficient reaction,
diffusing the sodium chloride into the liquid particles,
renewing the surface of said liquid particles to provide further reactive sites on said surface for cyclical reaction,
introducing said sorbent onto a bed of said solid waste materials being incinerated,
tieing-up the Lewis & Bronsted acid/base sites on the surface of said fly ash by said attaching of said sorbent partners to said fly ash, removal of chlorides in the form of HCl to minimize the presence of Cl$_2$ for reaction with organic matter in said flue gas and thereby substantially reduce the production of dioxins, and said sorbent being solid when introduced.

68. The method of claim 50 including, contacting said liquid particles with said chlorides for a time of at least 1 second to achieve sufficient reaction, diffusing the sodium chloride into the liquid particles, renewing the surface of said liquid particles to provide further reactive sites on said surface for cyclical reaction, introducing said sorbent into the overfire air supporting combustion of said solid waste materials, tieing-up the Lewis & Bronsted acid/base sites on the surface of said fly ash by said attaching of said sorbent particles to said fly ash, and removal of chlorides in the form of HCl to minimize the presence of Cl$_2$ for reaction with organic matter in said flue gas and thereby substantially reduce the production of dioxins.

69. The method of claim 50 including, contacting said liquid particles with said chlorides for a time of at least 1 second to achieve sufficient reaction, diffusing the sodium chloride into the liquid particles, renewing the surface of said liquid particles to provide further reactive sites on said surface for cyclical reaction, introducing said sorbent onto a bed of said solid waste materials being incinerated, introducing said sorbent into the overfire air supporting combustion of said solid waste materials, tieing-up the Lewis & Bronsted acid/base sites on the surface of said fly ash by said attaching of said sorbent particles to said fly ash, removal of chlorides in the form of HCl to minimize the presence of Cl$_2$ for reaction with organic matter in said flue gas and thereby substantially reduce the production of dioxins, and said sorbent being solid when introduced.

70. The method of reducing the noxious gases such as chlorides including hydrogen chloride and chlorine contained in flue gas generated by the incineration of waste materials in a furnace having a combustion chamber with a combustion zone in order to substantially reduce the formation of dioxins or the like for a cleaner effluent gas comprising:

introducing a sorbent comprising carbonated sodium into the combustion chamber and into the presence of said chloride gases, maintaining the temperature in said combustion chamber to be above about 1564° F. to incinerate said waste materials and form said flue gas and fly ash in said flue gas, melting said sorbent in said chamber to form a plurality of liquid particles, contacting said sorbent particles with said fly ash and attaching said particles to said fly ash to cover at least a portion of the surface of said fly ash while preventing at least in part said fly ash from any reaction activity with said chlorides, cooling said liquid particles to solidify said particles while retaining the attached fly ash with said particles, removing and collecting said solidified sorbent particles with said attached fly ash from said incinerator to minimize the reactive activity of said fly ash with said chlorides and thereby minimize the production of dioxins by said chlorides, introducing sodium bicarbonate into cooler flue gas of said furnace downstream of hotter flue gas generated in the combustion zone in said combustion chamber, positioning introduction of said sodium bicarbonate for at last 2 locations along the path of said cooler flue gas in a temperature range below about 1560° F. but not below about 520° F., heating said sodium bicarbonate in said cooler flue gas within said temperature range for a time sufficient to drive off the water and carbon dioxide from said sodium bicarbonate, forming sodium carbonate particles during said heating of said sodium bicarbonate, said sodium carbonate having a higher porosity to produce a greater reaction area on the surface of said particles, contacting said porous sodium carbonate with chlorides in said cooler flue gas for a sufficient time and temperature to react and produce sodium chloride and thereby prevent their formation of dioxins, and separating said sodium chloride from said cooler flue gas to produce a cleaner gas for exit to the atmosphere.

71. The method of claim 70 comprising, said sodium bicarbonate introduced into cooler flue gas being at approximately the end of the combustion zone toward the flue gas exit.

72. The method of claim 70 comprising, the time of said contact of said porous sodium carbonate with said chlorides being at least 1 second.

73. The method of claim 70 wherein, said chloride is HCl.

74. The method of claim 1 comprising, sorbing said chlorides onto and into the pores of said porous sodium carbonate.

75. The method of claim 74 wherein, said sorbing includes reacting said chlorides while maintaining an expansion coefficient of not greater than 1.

76. The method of claim 70 including, maintaining the temperature of the flue gas having the combustion chamber of said incinerator to below about 1564° F.

77. The method of claim 70 including, introducing said sodium bicarbonate into at least 3 locations down stream of any combustion of said solid waste materials.

78. The method of claim 70 including, said introduction of sodium bicarbonate being in powder form.

79. The method of claim 1 including, said sodium bicarbonate introduced into cooler flue gas being at approximately the end of the combustion zone toward the flue gas exit, and the time of said contact of said porous sodium carbonate with said chlorides being at least 1 second.

80. The method of claim 1 including, said sodium bicarbonate introduced into cooler flue gas being at approximately the end of the combustion zone toward the flue gas exit, the time of said contact of said porous sodium carbonate with said chlorides being at least 1 second, and said chloride is HCl.

81. The method of claim 1 including, injecting said sodium bicarbonate at approximately the end of the combustion zone toward the flue gas exit, the time of said contact of said porous sodium carbonate with said chlorides being at least 1 second, said chloride is HCl, and sorbing said chlorides onto and into the pores of said porous sodium carbonate.

82. The method of claim 1 including, said sodium bicarbonate introduced into cooler flue gas being at approximately the end of the combustion zone toward the flue gas exit, the time of said contact of said porous sodium carbonate with said chlorides being at least 1 second, said chloride is HCl, sorbing said chlorides onto and into the pores of said porous sodium carbonate, said sorbing includes reacting said chlorides while maintaining an expansion coefficient of not greater than 1, maintaining the temperature of the flue gas having the combustion chamber of said incinerator to below about 1564° F., and introducing said sodium bicarbonate into at least 2 locations down stream of any combustion of said solid waste materials.

83. The method of claim 70 including, contacting and reacting said liquid particles with chlorides during the time period said liquid particles remain liquid, producing sodium chloride as one of the products of the reaction between said liquid particles and said chlorides, retaining said products on said liquid particles for collection and removal upon solidification of said particles.

84. The method of claim 70 including, reacting said liquid particles with chlorides during the time period said liquid particles remain within said combustion, producing sodium chloride as one of the products of the reaction while attaching said particles to said fly ash, retaining said products and said fly ash to said liquid particles for collection and removal upon solidification of said particles.

85. The method of claim 70 including, retaining said liquid particles within the combustion chamber for adequate time to sufficiently react said liquid particles with said chlorides.

86. The method of claim 70 including, diffusing the sodium chloride into the liquid particles, and renewing the surface of said liquid particles to provide further reactive sites on said surface for cyclical reaction.

87. The method of claim 70 including, introducing said sorbent onto a bed of said solid waste materials being incinerated.

88. The method of claim 70 including, introducing said sorbent into the overfire air supporting combustion of said solid waste materials.

89. The method of claim 70 including, tieing-up the Lewis & Bronsted acid/base sites on the surface of said fly ash by said attaching of said sorbent particles to said fly ash.

90. The method of claim 70 including, removal of chlorides in the form of HCl to minimize the presence of $Cl_2$ for reaction with organic matter in said flue gas and thereby substantially reduce the production of dioxins.

91. The method of claim 24 including, said fly ash having chlorides attached thereto, and removing said chlorides from said combustion zone by attaching said sorbent liquid particles to said fly ash.

92. The process of claim 70 including, contacting said liquid particles with said chlorides for a time of at least 1 second to achieve sufficient reaction.

93. The process of claim 70 including, diffusing the sodium chloride into the liquid particles, renewing the surface of said liquid particles to provide further reactive sites on said surface for cyclical reaction, and introducing said sorbent into the overfire air supporting combustion of said solid waste materials.

94. The process of claim 70 including, retaining said liquid particles within the combustion chamber for adequate time to sufficiently react said liquid particles with said chlorides, diffusing the sodium chloride into the liquid particles, renewing the surface of said liquid particles to provide further reactive sites on said surface for cyclical reaction, and introducing said sorbent onto a bed of said solid waste materials being incinerated.

95. The process of claim 70 including, contacting said liquid particles with said chlorides for a time of at least 1 second to achieve sufficient reaction, diffusing the sodium chloride into the liquid particles, and renewing the surface of said liquid particles to provide further reactive sites on said surface for cyclical reaction.

96. The process of claim 70 including, retaining said liquid particles within the combustion chamber for adequate time to sufficiently react said liquid particles with said chlorides, diffusing the sodium chloride into the liquid particles, renewing the surface of said liquid particles to provide further reactive sites on said surface for cyclical reaction, introducing said sorbent onto a bed of said solid waste materials being incinerated, introducing said sorbent into the overfire air supporting combustion of said solid waste materials, and removal of chlorides in the form of HCl to minimize the presence of $Cl_2$ for reaction with organic matter in said flue gas and thereby substantially reduce the production of dioxins.

97. The process of claim 70 including, retaining said liquid particles within the combustion chamber for adequate time to sufficiently react said liquid particles with said chlorides, diffusing the sodium chloride into the liquid particles, renewing the surface of said liquid particles to provide further reactive sites on said surface for cyclical reaction, introducing said sorbent into the overfire air supporting combustion of said solid waste materials, tieing-up the Lewis & Bronsted acid/base sites on the surface of said fly ash by said attaching of said sorbent particles to said fly ash, and removal of chlorides in the form of HCl to minimize the presence of Cl$_2$ for reaction with organic matter in said flue gas and thereby substantially reduce the production of dioxins.

98. The process of claim 25 including, retaining said liquid particles within the combustion chamber for adequate time to sufficiently react said liquid particles with said chlorides, diffusing the sodium chloride into the liquid particles, renewing the surface of said liquid particles to provide further reactive sites on said surface for cyclical reaction, introducing said sorbent onto a bed of said solid waste materials being incinerated, tieing-up the Lewis & Bronsted acid/base sites on the surface of said fly ash by said attaching of said sorbent particles to said fly ash, removal of chlorides in the form of HCl to minimize the presence of Cl$_2$ for reaction with organic matter in said flue gas and thereby substantially reduce the production of dioxins, said fly ash having chlorides attached thereto, and removing said chlorides from said combustion zone by attaching said sorbent liquid particles to said fly ash.

99. A method of reducing the noxious gases such as chlorides including hydrogen chloride and chlorine from the flue gases derived from the incineration of solid waste materials in a furnace with a combustion chamber and a combustion zone to substantially reduce the formation of dioxins for a cleaner effluent gas to the atmosphere, comprising:

introducing carbonated sodium as sorbent into said flue gas of a furnace incinerating said waste materials, positioning introduction of said sorbent for at least one location along the path of said flue gas at a temperature below about 1564° F. but not below about 518° F., contacting said sorbent with chlorides in said flue gases for a sufficient time and temperature to react and produce sodium chloride and thereby prevent their formation of dioxins, and separating said sodium chloride from said flue gas to produce a cleaner gas for exit to the atmosphere.

100. The process of claim 99 wherein, sulfur oxides are included in the noxious gases and including the steps of, contacting said sorbent with said sulfur oxides in said flue gases for a sufficient time and temperature to react and produce sodium sulfite and sodium sulfate, and separating said sodium sulfite and sodium sulfate to produce a cleaner gas for exit to the atmosphere.

* * * * *